(12) United States Patent
Smatloch et al.

(10) Patent No.: US 9,341,081 B2
(45) Date of Patent: May 17, 2016

(54) TURBINE HOUSING OF AN EXHAUST GAS TURBOCHARGER

(75) Inventors: Christian Smatloch, Paderborn (DE); Elmar Grussmann, Altenbeken (DE)

(73) Assignee: BENTELER AUTOMOBILTECHNIK GMBH, Paderborn (DE)

(*) Notice: Subject to any disclaimer, the term of this patent is extended or adjusted under 35 U.S.C. 154(b) by 750 days.

(21) Appl. No.: 13/699,196

(22) PCT Filed: May 19, 2011

(86) PCT No.: PCT/DE2011/001087
§ 371 (c)(1),
(2), (4) Date: Nov. 20, 2012

(87) PCT Pub. No.: WO2011/153987
PCT Pub. Date: Dec. 15, 2011

(65) Prior Publication Data
US 2013/0064656 A1    Mar. 14, 2013

(30) Foreign Application Priority Data

May 21, 2010   (DE) .......................... 10 2010 022 218

(51) Int. Cl.
*F02C 6/12*    (2006.01)
*F01D 25/24*    (2006.01)
*F01D 9/02*    (2006.01)

(52) U.S. Cl.
CPC ............. *F01D 25/24* (2013.01); *F01D 9/026* (2013.01); *F02C 6/12* (2013.01); *F05D 2220/40* (2013.01); *F05D 2240/55* (2013.01)

(58) Field of Classification Search
CPC ..... F01D 25/24; F01D 25/243; F01D 25/246; F01D 9/00; F01D 9/023; F01D 11/00; F01D 11/005; F01D 25/265; F01D 9/02; F01D 9/026; F04D 29/582; F04D 29/4206; F02C 6/12; F05D 2220/40; F05D 2240/55

See application file for complete search history.

(56) References Cited

U.S. PATENT DOCUMENTS

| 2,841,419 | A | 7/1958 | Jay |
| 4,401,622 | A * | 8/1983 | Benn ...................... C22C 19/056 420/448 |
| 7,074,009 | B2 * | 7/2006 | Allmang ................. F01D 9/026 415/177 |
| 7,198,459 | B2 * | 4/2007 | Grussmann ............. F01D 9/026 415/134 |
| 8,382,429 | B2 * | 2/2013 | Grussmann ............... F01D 9/02 415/211.2 |
| 2010/0098533 | A1 | 4/2010 | Grussmann et al. |

FOREIGN PATENT DOCUMENTS

| DE | 100 22 052 | 3/2001 |
| DE | 102 23 838 | 10/2003 |

(Continued)

*Primary Examiner* — Richard Edgar
*Assistant Examiner* — Brian P Wolcott
(74) *Attorney, Agent, or Firm* — Henry M. Feiereisen LLC

(57) ABSTRACT

A turbine housing of an exhaust gas turbocharger includes an outer housing, in which an inner housing with a tubular nozzle and an outlet duct for connection to an exhaust gas system is arranged, wherein the outlet duct is coupled to the tubular nozzle via a sealing lip for relative movement. The sealing lip is inwardly evertedly pushed onto the nozzle and for positional fixing, a sliding sleeve is further arranged on the nozzle, wherein the sliding sleeve and the nozzle form a gap in which an end of the sealing lip is received. This avoids that the sealing lip lifts of due to pressure differences and thus that gas leaks occur. Further, an end of the sealing lip is arranged so as to be thermally protected.

18 Claims, 1 Drawing Sheet

(56) References Cited

FOREIGN PATENT DOCUMENTS

| | | |
|---|---|---|
| DE | 103 52 960 | 8/2005 |
| DK | EP 0573383 A1 * 12/1993 ........... F16J 15/0806 | |
| EP | 0 918 140 | 5/1999 |
| EP | 1 895 120 | 3/2008 |
| EP | 2 180 163 | 4/2010 |
| JP | 2001-304466 | 10/2001 |
| JP | 2005-147139 | 6/2005 |

* cited by examiner

TURBINE HOUSING OF AN EXHAUST GAS TURBOCHARGER

CROSS-REFERENCES TO RELATED APPLICATIONS

This application is the U.S. National Stage of International Application No. PCT/DE2011/001087, filed May 19, 2011, which designated the United States and has been published as International Publication No. WO 2011/153987 A1 and which claims the priority of German Patent Application, Serial No. 10 2010 022 218.6, filed May 21, 2010, pursuant to 35 U.S.C. 119(a)-(d).

BACKGROUND OF THE INVENTION

The present invention relates to a turbine housing of an exhaust gas turbocharger.

Internal combustion engines, in particular those used in motor vehicles are increasingly charged by fluid kinetic machines in order to further increase performance and with this lower fuel consumption. Preferably, turbochargers are used as fluid kinetic machines. The turbocharger, and in particular the housing of the turbocharger are adjusted very accurately to the performance characteristic of the respective engine.

In order for the turbocharger to operate with a high performance, it is very important to ensure exact clearances between individual components of the turbocharger before, during and after operation. In between the individual operating states, temperature differences of up to several 100° C. occur which result in different expansions in the different components and used materials and material thicknesses. In case of expansion, the clearances also change so that an undesired blowby may occur within the turbocharger. This causes a reduction of the performance of the turbocharger. Also, components may come into contact with each other due to different expansions. In a worst case, collisions of the components occur, which cause damage to or a total failure of the turbocharger.

Further, the weight reduction of all materials and components used in motor vehicle construction is very important. Here, a turbocharger, in particular a housing of a turbocharger constructed from sheet metal is sought to be produced particularly lightweight.

DE 100 22 0 52 A1 proposes the de-coupling of exhaust gas conducting components and to support or seal outer structures. While the exhaust gas conducting components of the turbocharger are exposed to high thermal stress, so that as to glow, the thermal stress on the sealing outer structures is significantly smaller. However, the outer housing, in particular in the areas of the connection to the bearing housing of a turbocharger and also at the inlet sides of the relatively hot exhaust gas are also exposed to very high thermal flow technical stresses.

The outer housing of a turbocharger generally consists of formed sheet metal shells which are usually welded together with bearing flanges using thermal joining. Also coupled to the bearing flanges is an inner housing of the exhaust gas turbocharger.

Usually, the inner housings rest against the bearing flanges or are additionally materially bonded to the bearing flanges. When the inner housing rests against the bearing flanges, an incomplete sealing and with this blowby may occur due to the different coefficients of thermal expansion. In case of a bonding coupling, the zone impacted by heat during the thermal joining process is geometrically and materially weakened by the thermal joining process. At this point, fatigue fractures or cracks may form in case of extreme stresses.

SUMMARY OF THE INVENTION

The object of the present invention is therefore to increase the tightness and the durability of an exhaust gas turbocharger so that the thermal stresses do not result in a premature failure of the components and thermally based expansions are compensated by the construction of the exhaust gas turbocharger.

The previously mentioned object is solved by a turbine housing for an exhaust gas turbocharger which includes an outer housing, in which an inner housing having a tubular nozzle and an outlet duct are arranged for connection with an exhaust gas system, wherein the outlet duct is coupled to the tubular nozzle via a sealing lip for relative movement, characterized in that the sealing lip is pushed onto the nozzle inwardly everted and a sliding sleeve is arranged on the nozzle, wherein the sliding sleeve and the nozzle form a gap in which an end of the sealing lip is received.

Advantageous embodiments of the present in invention are set forth in the dependent claims.

The turbine housing of an exhaust gas turbocharger according to the invention which includes an outer housing in which an inner housing with a tube shaped nozzle and an outlet duct for connection to an exhaust gas system are arranged, wherein the outlet duct is coupled to the tube shaped nozzle via a sealing lip for movement relative to the nozzle, is characterized in that the sealing lip is everted inward and pushed onto the nozzle, and in that a sliding sleeve is arranged on the nozzle, wherein the sliding sleeve and the nozzle form a gap in which an end of the sealing lip is received.

Particularly advantageous in the construction according to the invention is that the inwardly everted sealing lip between the nozzle and the outlet duct enables a compensation of different thermal expansions of the individual components relative to one another. For this, the sealing lip has particularly advantageously, a very thin wall thickness which enables a sliding and/or rolling off of the sealing lip on the nozzle.

The sealing lip in turn rests on the nozzle, in particular in a form fitting manner, particularly preferably with a press fit. Due to the pressure differences between the inner housing and the outer housing of the exhaust gas turbocharger however, the sealing lip may lift off and thus detach from the nozzle. This leads to so called blowby effects which reduce the performance of the exhaust gas turbocharger. For compensating the lift off, a sliding sleeve is arranged on the nozzle so that a gap is formed between a sealing shoulder of the sliding sleeve and the nozzle itself, in which gap an end of the sealing lip is arranged. The sliding sleeve, in particular the area of the sealing shoulder, thus receives the end of the sealing lip in the gap and additionally causes the end to form fittingly rest against the nozzle. In particular, a press fit can then be formed within the context of the invention between the sealing shoulder and the sealing lip, or respectively the nozzle. As a result, a lifting off of the sealing lip is prevented.

In a further advantageous embodiment of the present invention, the sealing lip is additionally supported in the gap so that relative movements of the end of the sealing lip are possible. By this, tension cracks and/or other metallurgical defects in the material of the sealing lip are avoided.

In an advantageous embodiment of the present invention, the gap is circumferentially arranged on the nozzle so as to be oriented parallel to a rotation axis of the turbine wheel, wherein the gap is formed between an outer sheath surface of the nozzle and a sealing shoulder of the sliding sleeve. In particular, the gap is oriented toward the turbine wheel, so that the sealing shoulder and the sealing lip are not exposed to the direct direction of flow of the exhaust gas. This increases the service life of the coupling according to the invention.

Advantageously, the end of the sealing lip is supported in the gap for relative movement. The end of the sealing lip can thus slide between the sealing shoulder and the nozzle, which avoids tearing off of the sealing lip due to the different absolute pressures in the inner housing and between the inner housing and the outer housing.

In a further advantageous embodiment of the present invention, the end of the sealing lip at a nozzle side has, at least in some regions, a surface which is rougher relative to the remaining sealing lip. The rougher surface in this area enables adjusting and/or reducing the sliding of the sealing lip to a desired level. The rough surface also allows positional fixing of the sealing lip. A corresponding engagement at the sealing shoulder and/or the outer sheath surface of the nozzle results from a micro toothing between the rough surface of the sealing lip and the respectively corresponding surface mentioned previously.

In a further advantageous embodiment, the end of the sealing shoulder is angled so as to point radially outward, preferably the sealing shoulder has a radius. This avoids damage to the sliding or rolling sealing lip. When it comes into the region of the end of the sealing shoulder, it rests against the angled end or the radius which is formed here. The angled end can also relate to a circumferential collar.

In a further advantageous embodiment, the sliding sleeve is materially bonded to an end of the nozzle, preferably by means of a thermal joining process. In particular, a welding process can be used for this purpose, for example a WIG-welding process, laser welding process or an MAG-welding process. The material bonding ensures that the sliding sleeve always holds its position. A shifting or sliding of the sliding sleeve due to different thermal expansions between nozzle and sliding sleeve itself is thus avoided. The thermally impacted zone of the thermal coupling between the end of the nozzle and the sliding sleeve is thus located at a maximal distance to the narrow sealing lip. Damage to the sealing lip during the manufacturing process of the turbine housing according to the invention is thus avoided.

In a further advantageous embodiment, a support ring is arranged on the outlet duct, wherein the outlet duct and the outlet duct support ring are preferably thermally coupled to each other. Optionally, the sealing lip may additionally be coupled by thermal joining. This ensures that the outlet duct and also the outlet duct support ring and optionally the sealing lip are securely and fixedly coupled to each other, and ensures that no sliding occurs during the entire time of operation of the turbine housing according to the invention. Preferably, the outlet duct itself is radially inwardly bent with a collar and the outlet duct support ring is radially outwardly bent with a collar so that a sliding or rolling off of the sealing lip does not cause damage in this region.

Preferably, an interference fit is formed at the sites of coupling of the sealing lip to the outlet duct and/or the nozzle. Gas leakage in these regions is reduced to a minimum due to the press fit. This ensures a high performance over the entire time of use at a broad range of different operating conditions of the turbine housing according to the invention.

Further preferably, a transition fit or an interference fit is formed in the coupling sites of the sealing lip with the sealing shoulder and/or the outlet duct nozzle. This ensures that the additional fit, caused by the sealing shoulder and/or the outer duct support ring further compensates the lifting off of the sealing lip due to the pressure difference between an inner system and an outer system. This also ensures a high performance during different operating conditions and/or over the entire time of use of the turbine housing according to the invention.

The coupling between the turbine housing between the inner system and the outer system of according to the invention is characterized in that the inner housing is supported for radial and axial movement relative to the outlet duct, with regard to the rotation axis of the turbine wheel. The different thermal expansions are thus compensated by relative sliding, without loss of tightness and without influencing the service life due to mechanical contacts and associated defects. In order to always provide a good relative slidability of the sealing lip, the sealing lip preferably has a wall thickness of less than 0.5 mm, preferably less than 0.2 mm. When using metallic materials, in particular stainless steel materials, ensures sufficient pressure tightness while at the same time enabling gliding. The sealing lip is made of heat resistant steel materials, in particular, the sealing lip is made of a nickel based alloy.

In a further advantageous embodiment of the present invention, the sealing lip is configured double-walled. By this, the system of the sealing lip is configured redundant, on the other hand this makes it possible to ensure a good flexibility by directly abutting sealing lips due to thin walled configuration an at the same time good pressure tightness due to two sealing lips which lie directly on top of each other in form of pressure walls.

BRIEF DESCRIPTION OF THE DRAWING

Further advantages, features, properties and aspects of the present invention are set forth in the following description. Preferred embodiments are shown in the schematic drawings. These serve for facilitating understanding of the invention. It is shown in.

In the description, the same reference signs are used for same or similar components, even when a repeated description is not given for reasons of simplicity.

DETAILED DESCRIPTION OF PREFERRED EMBODIMENTS

Figure 1:
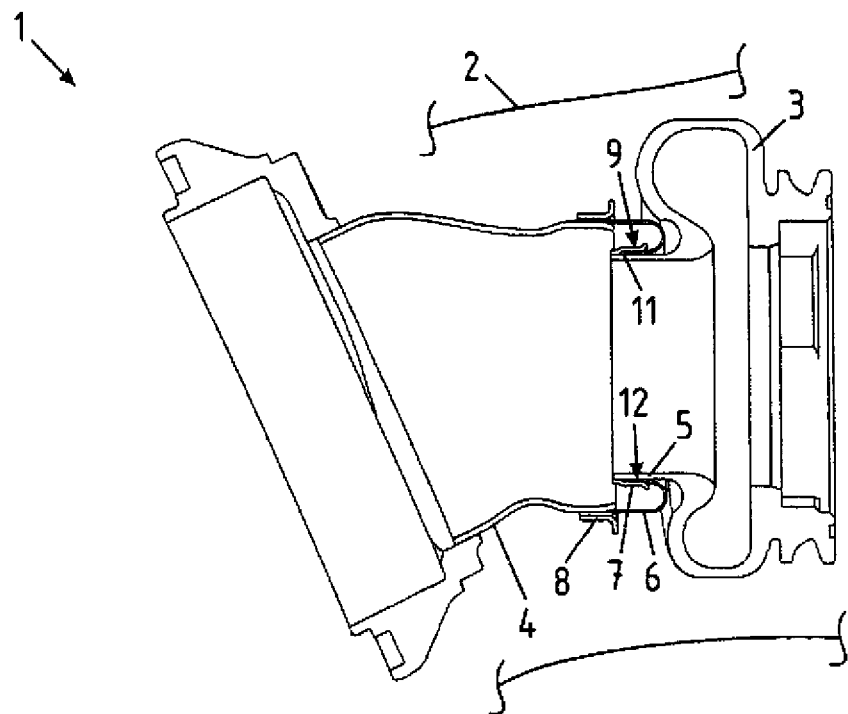
FIG. 1 a cross sectional view of an inner housing connected to an outlet duct via a sealing lip and FIG. 2 a detail view of the construction according to the invention with sealing lip.

FIG. 1 shows a turbine housing 1 of an exhaust gas turbocharger according to the invention, which turbine housing 1 has a schematically indicated outer housing 2 and an inner housing 3 located in the outer housing 2. The inner housing 3 has in the direction of an outlet duct 4 a nozzle 5, wherein between the outlet duct 4 and the nozzle 5 a sealing function is created via a sealing lip 6. In order for the sealing lip to sit securely on the nozzle as well as on the outlet duct 4 the sealing lip is respectively secured with a support ring. On the nozzle, the support ring is configured in the form of a sliding sleeve 7, on the outlet duct in the form of an outlet duct support ring 8. The sliding sleeve 7 has further a sealing shoulder 9. Between the sealing shoulder 9 and the outer sheath surface 10 of the nozzle 5 a gap 11 is thus formed, in which an end 12 of the sealing lip 6 is arranged.

Figure 2:
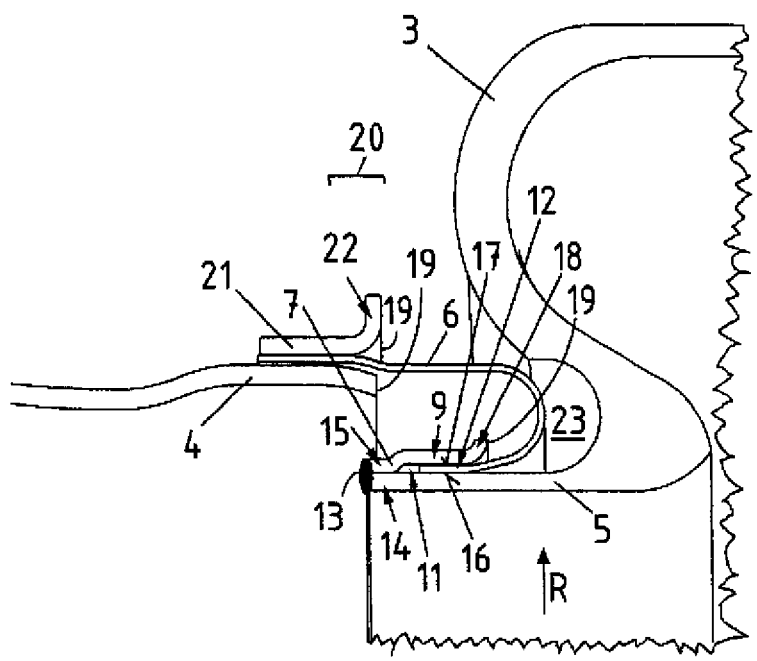

FIG. 2 shows a detailed view of the coupling according to the invention between outlet duct 4 and nozzle 5 with a sealing lip 6. The sliding sleeve 7 is preferably coupled with a nozzle end 14 via a thermal joining seam 13, In particular, the thermal joining seam 13 is also arranged on a sliding sleeve end 15 of the sliding sleeve 7. The end 12 of the sealing lip 6 is supported in the gap 11 for relative movement. Optionally, a nozzle side 16 and/or a sliding sleeve side 17 of the sealing lip 6 can have a surface which is rougher compared to the remaining material of the sealing lip 6.

Further particularly preferably a sealing shoulder end 18 of the sliding sleeve 7 is angled radially outwardly in radial direction R with a collar 19. This results in a soft edge, so that the sealing lip 6, when contacting the sealing shoulder end 18 does not suffer any mechanical damage. Also, an outlet duct end 20 is configured so as to point radially inward with a collar 19, and an outlet duct support ring 21 is configured with its outlet duct support ring end 22 to point radially outward with a collar 19. Also, no mechanical damage occurs in case of a contact with the sealing lip 6.

The inner housing 3 further has a sealing shoulder receptacle 23 in the form of an indentation. In the case of sliding and/or the axial movement, the sealing lip 6 can thus move freely in the sealing shoulder receptacle 23 without the sealing lip 6 coming into contact with the sealing shoulder receptacle 23. Also in this case no mechanical damage occurs due to avoiding sharp edges.

The invention claimed is:

1. A turbine housing of an exhaust gas turbocharger, comprising
    an outer housing;
    an inner housing arranged in the outer housing and having a tubular nozzle and an outlet duct for connection with an exhaust gas system;
    a sealing lip coupling the outlet duct to the tubular nozzle for movement of the outlet duct relative to the nozzle, wherein the sealing lip is pushed onto the nozzle in an inwardly everted manner; and
    a sliding sleeve arranged on the nozzle, wherein the sliding sleeve and the nozzle form a gap which receives an end of the sealing lip.

2. The turbine housing of claim 1, wherein the gap circumferentially surrounds the nozzle so as to be oriented parallel to a turbine wheel rotation axis, and is formed between an outer sheath surface of the nozzle and a sealing shoulder of the sliding sleeve.

3. The turbine housing of claim 1, wherein an end of the sealing lip is supported in the gap for the movement of the outlet duct relative to the nozzle.

4. The turbine housing of claim 1, wherein at least some regions of the end of the sealing lip have a surface on a side of the nozzle and/or on a side of the sliding sleeve side which is rougher relative to remaining portions of the sealing lip.

5. The turbine housing of claim 1, wherein an end of the sealing shoulder is angled to point radially outward.

6. The turbine housing of claim 5, wherein the end of the sealing shoulder has a radius.

7. The turbine housing of claim 1, wherein the sliding sleeve is materially bonded to an end of the nozzle.

8. The turbine housing of claim 7, wherein the sliding sleeve is materially bonded to the end of the nozzle by a thermal joining process.

9. The turbine housing of claim 1, further comprising an outlet duct support ring, materially bonded to the outlet duct.

10. The turbine housing of claim 9, wherein the outlet duct support ring, the outlet duct and the sealing lip are materially bonded to one another.

11. The turbine housing of claim 1, wherein the outlet duct support ring is widened in a direction of the inner housing.

12. The turbine housing of claim 1, wherein an interference fit is formed at sites of coupling of the sealing lip with the outlet duct and/or the nozzle.

13. The turbine housing of claim 2, wherein an interference fit is formed at sites of coupling of the sealing lip with the sealing shoulder and/or an outlet duct support ring.

14. The turbine housing of claim 1, wherein the inner housing is supported for axial and radial movement relative to the outlet duct with regard to a turbine wheel rotation axis.

15. The turbine housing of claim 1, wherein the sealing lip has a wall thickness of less than 0.5 mm.

16. The turbine housing of claim 1, wherein the sealing lip has a wall thickness of less than 0.2 mm.

17. The turbine housing of claim 1, wherein the sealing lip is made of a nickel based alloy.

18. The turbine housing of claim 1, wherein the sealing lip is configured double-walled.

* * * * *